(12) United States Patent
Kennedy

(10) Patent No.: US 6,840,764 B1
(45) Date of Patent: Jan. 11, 2005

(54) APPARATUS AND PROCESS FOR PRODUCING CHARCOAL FROM WOOD

(76) Inventor: Eugene Kennedy, 3705 Arctic Blvd., #2768, Anchorage, AK (US) 99503

( * ) Notice: Subject to any disclaimer, the term of this patent is extended or adjusted under 35 U.S.C. 154(b) by 0 days.

(21) Appl. No.: 10/663,541

(22) Filed: Sep. 16, 2003

(51) Int. Cl.⁷ ................................................ F27B 14/10
(52) U.S. Cl. ........................ 432/156; 432/262; 44/590; 44/620; 202/93; 202/211
(58) Field of Search ................................. 432/156, 158, 432/192, 195, 262, 254.1; 44/550, 590, 620, 621, 634; 202/93, 101, 211, 212, 214

(56) References Cited

U.S. PATENT DOCUMENTS

| | | | | |
|---|---|---|---|---|
| 4,201,186 A | * | 5/1980 | Paquin | 126/83 |
| 4,555,993 A | * | 12/1985 | Gallaro | 110/234 |
| 4,829,914 A | * | 5/1989 | Boucher | 110/234 |
| 4,951,582 A | * | 8/1990 | Childs | 110/317 |
| 5,435,983 A | * | 7/1995 | Antal, Jr. | 423/445 R |
| 5,551,958 A | * | 9/1996 | Antal, Jr. | 44/629 |

* cited by examiner

*Primary Examiner*—Gregory Wilson
(74) *Attorney, Agent, or Firm*—Barnes & Thornburg

(57) ABSTRACT

An apparatus and process for producing charcoal in a kiln from hardwood. The kiln is constructed over an array of hardwood logs supported on a suitable platform. Fill material is used to form a surrounding jacket surrounding the hardwood, a sawdust layer is applied over the surrounding jacket, and an airtight layer of clay earth and sand is applied over the sawdust layer. An ignition access port is provided through the several layers to allow ignition and combustion of the hardwood, after which the access port is closed to prevent air from entering the interior of the kiln during burning of the hardwood. After a predetermined burning time, the kiln and its contents are allowed to cool, and the filler, clay earth, sand and any remaining debris are removed from the hardwood. The hardwood is then cooled a second time, and then cooled a third time by stifling the hardwood, such as in a cooling box capped with earth.

19 Claims, 1 Drawing Sheet

APPARATUS AND PROCESS FOR PRODUCING CHARCOAL FROM WOOD

BACKGROUND OF THE INVENTION

The present invention relates to an apparatus and method for producing charcoal, and in particular an apparatus and method that utilizes an airless kiln composed of a composite layer of clay, dirt and sand, and a sawdust layer.

Charcoal is a dark, brittle substance that is used in color pigments, in drawing instruments, in gunpowder, and in odor, color and flavor filters. The most well known use of charcoal is as a fuel for cooking, particularly home barbecue cooking, in a briquette form. Small portions of charcoal burn well and make a suitable fuel.

Charcoal is composed primarily of ash and amorphous carbon, the latter comprising carbon made of small irregularly arranged particles of graphite, which is a pure form of carbon.

Charcoal also includes trace amounts of impurities, such as hydrogen compounds and sulfur. Charcoal is produced by heating plant or animal material rich in carbon, such as wood, bones or other vegetation, in kilns that contain little or no air. The material in the kiln is combusted, and during heating, a majority of the oxygen, hydrogen and nitrogen escapes from the burning materials. The remaining product is a dark, porous material, which is charcoal.

Wood charcoal is one of the most common types of charcoal, and consists primarily of carbon, with traces of ash and other impurities. Activated charcoal is charcoal from which the impurities have been removed. Activated charcoal is normally produced by treating ordinary charcoal with steam and air heated to over 600° F. (315° C.).

Charcoal producing retorts, or kilns, are of varied types and structure. By way of example, workable kilns can be made of a mixture of dirt and cow manure. These kilns did not adequately isolate the interior of the kiln from air, and led to the possibility of emitting noxious, if not toxic, gasses as the temperature of the manure rose upon combustion of the wood inside the kiln.

Typical presently available charcoal-producing kilns and processes are disclosed in the prior art. For example, U.S. Pat. No. 1,538,505 disclose a process for providing charcoal in any type of retort, where the mineral matter from which the charcoal is produced is pre-treated to remove soluble inorganic matter before subjecting the mineral matter to a carbonizing process. U.S. Pat. No. 4,510,021 discloses a fluidized bed charcoal production system, utilizing a pyrolytic heating vessel, not an earth-sawdust combustion airtight kiln. U.S. Pat. No. 4,583,992 discloses an upright, cylindrical down-draft gasifier having a rotatable grate. This patent does not disclose an air-tight kiln comprising walls of clay dirt and sawdust, as does the present invention. U.S. Pat. No. 4,856,491 disclose a solid fuel heating apparatus having primary and secondary combustion chambers, which is not air-tight, and emits a small amount of polluting particles. U.S. Pat. Nos. 5,435,983 and 5,551,958 each disclose charcoal-producing reactors that are partially insulated, and are made of metal material. Neither of these two latter references teach or disclose a kiln for producing charcoal comprising a combination of clay dirt and sawdust.

SUMMARY OF THE INVENTION

The present invention provides a novel, useful and inexpensive apparatus and method for producing charcoal material from wood. The oven, or kiln, for heating the wood comprises a planar surface at the bottom, preferably an earthen or ground floor. The upper portion of the kiln can be dome-like in shape to provide a heating chamber in the kiln. The upper portion of the kiln is composed of an earth layer that is substantially air impervious, whereby the oven chamber is capable of being hermetically sealed.

To begin construction of the charcoal-producing kiln, a platform to support the wood in the chamber of the kiln is provided by building a footer of logs on the floor or ground surface of the chamber. The wood is then piled onto the platform to a depth of several layers of logs. The logs are then covered and surrounded by a jacket, preferably made of birch wood waste or segments, the jacket formed into the shape of a mound completely covering the logs. A sawdust layer is then applied over the wood-waste jacket, The earth layer, described above, is applied over the sawdust. An access port is provided on one end of the kiln to allow ignition of the wood and the other materials inside the kiln. After combustion starts, the access port is filled in or otherwise closed to prevent air from entering the oven chamber.

In the process of the present invention preferably, only green or dry wood is used in producing the charcoal. The wood logs are stacked on the floor of the kiln in a linear, or parallel, array. After construction of the kiln, as described above, the material in the kiln chamber is ignited and allowed to burn for about thirty three hours per ton of charcoal, depending upon the quantity of wood used. When properly dried wood is used in the process, the resulting charcoal has a preferred gray color. If the wood is initially moist, the charcoal is black, due to insufficient time of burning, as shown by blackish smoke, or due to use of a poor quality of wood.

After the burning time, a period of twenty-four hours elapses before the earthen outer cover, sawdust and any remaining filler is removed from the wood logs, which have now turned to charcoal. The remaining uncovered charcoal is left to cool in the open air for an additional twenty four hours. The charcoal is then placed in a cooling box for twenty four hours for final cooling by covering the cooling box with earth to avoid re-combustion of the charcoal. The charcoal is then ready for packaging and sale to the ultimate consumer.

DETAILED DESCRIPTION OF THE ILLUSTRATED EMBODIMENT

The construction and structure of the charcoal producing oven or kiln in accordance with the illustrated embodiment of the present invention will first be described, followed by a description of the novel process used to produce charcoal.

Figure 1:
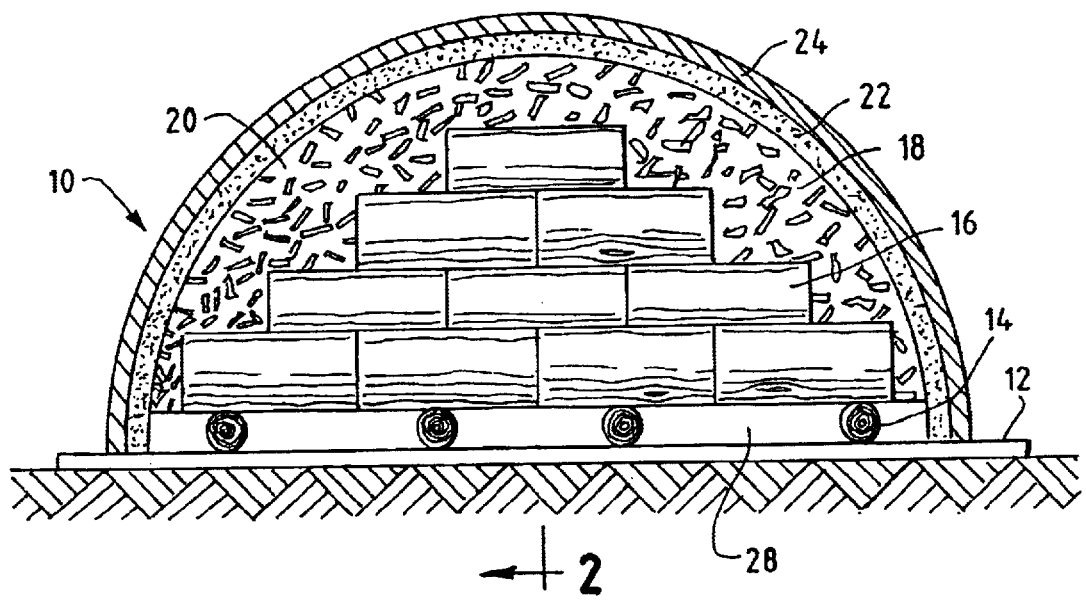
FIG. 1 is a cross-sectional side view of the charcoal-producing oven or kiln constructed according to an embodiment of the present invention, showing the placement of wood logs in the oven or kiln.
Figure 2:
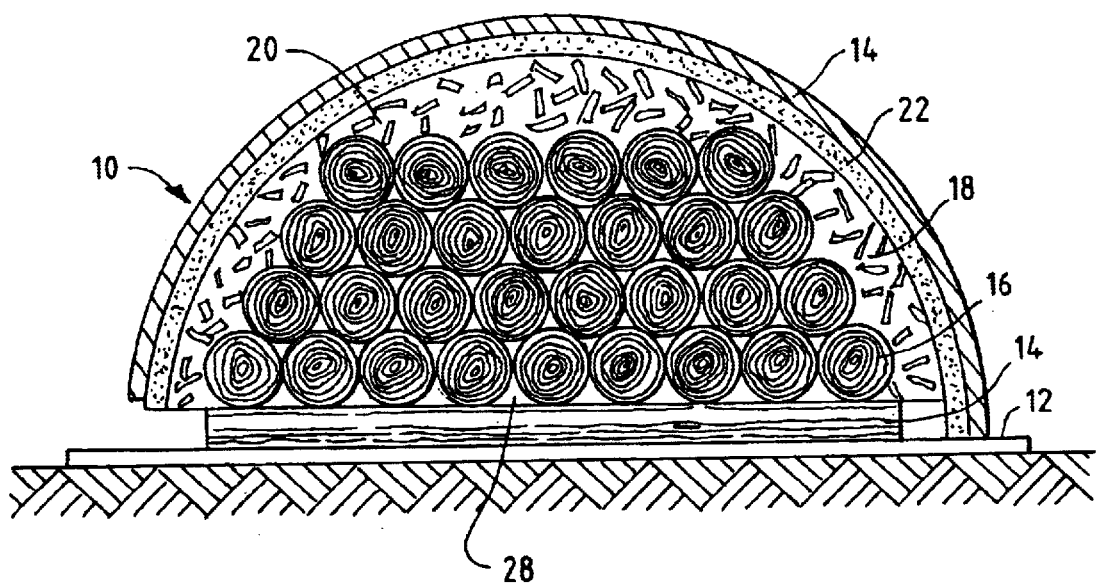
FIG. 2 is a cross-sectional side view of the oven or kiln of FIG. 1, illustrating the wood logs and other materials in the oven or kiln prior to combustion.

The oven or kiln shown in FIGS. 1 and 2 is generally designated by the numeral 10. The floor 12 of the oven is formed by a planar, flat surface on the ground. Also, other heat resistant materials can be used for the floor 12 if desired.

A platform 14 comprising spaced-apart hardwood logs 16 or other suitable material, are placed on floor 12 and aligned in a substantially axially parallel, or other configuration to provide strength to support the logs 16 and additional materials to be stacked and otherwise applied on top of the platform 14.

The stacked hardwood logs 16 are covered and surrounded by filling pieces 18, such as dry pieces of birch wood and/or waste birch wood, to provide a surrounding jacket 20. A layer of sawdust 22 is applied over the surrounding jacket 20. Next, an outer layer 24 comprising a mixture of clay earth and sand is applied over the sawdust layer, and compacted to ensure that no air can penetrate the outer layer. The outer layer 24 may be in the range of approximately one to two feet thick.

During construction of the kiln 10, access from the outside to the interior of the kiln 10 is provided by creating a channel or port 26 through the clay earth and sand layer 24, sawdust layer 22 and surrounding jacket 20, leading towards the lower portion of logs 16. Combustion of the logs 16 is initiated by extending lit or lightable ignition materials through the channel 26 until the logs 16 ignite. After ignition, the access channel 26 is filled in or otherwise closed during burning of the logs to prevent air from entering combination chamber 28. In larger kilns or ovens 20, an additional ignition channel 26 can be provided.

Logs 16 may be made from birch wood, or other hardwoods with similar characteristics. In constructing the clay earth and sand layer 24, earth with stone or gravel elements, or iron or other metal content, should be substantially avoided. This will prevent the formation of slag in the final charcoal product. As a result of the clay earth and sand layer 24, rain or snow cannot impregnate the kiln 10 to possibly degrade the charcoal.

The process of obtaining charcoal from the kiln 10 constructed as set forth above will now be described. The hardwood logs 16 are ignited by extending a lit igniter through channel 26 until logs 16 begin to combust. The ignition system may also comprise a plurality of paper and firewood sticks or kindling placed beneath the logs 16 in the spaces between the elements of platform 14. After combustion begins, channel 26 is blocked to prevent ambient air from entering chamber 28. In rectangular shaped pits, ignition takes place beneath the logs 16 at one or two points, depending on the dimensions of the kiln 10. Where the kiln is round, or dome-shaped, ignition may be carried out from just one point at the top of the kiln 10.

The logs 16 are allowed to burn in the airtight chamber 28 of the kiln 10 for about thirty three hours per ton of charcoal. If the wood logs 16 are dry, the resulting charcoal will have a gray color. If the wood 16 is moist, the resulting charcoal will be black in color, as a result of insufficient burning time, or as a result of the use of rotten or poor quality wood.

The kiln 10 and its contents are not disturbed until 24 hours after the end of the burning time to prepare for uncovering the kiln and recovering the charcoal. After the twenty four hour period expires, impurities such as earth, sawdust and other extraneous matter are removed. The remaining charcoal is then left undisturbed for an additional twenty four hours for initial cooling purposes.

Following this initial cooling process, the charcoal is placed in a cooling box for final cooling through stifling, whereby the cooling box is capped with earth for forty eight hours to prevent re-ignition of the charcoal.

During the charcoal production process set forth above, the color of the smoke produced during coal baking is white-gray. The smoke produces no noxious odors, nor toxic fumes.

The apparatus and method of the present invention may be embodied in other specific forms without departing from the spirit of the described embodiments. Thus, the illustrated and described embodiment should be considered as illustrative, and not for the purpose of restricting the scope of the present invention. The scope of the present invention is indicated by the claims set forth below, and all modifications that come within the meaning, range and/or equivalency of the appended claims are intended to be embraced within the meaning of the claims.

I claim:

1. A kiln structure for producing charcoal from wood members comprising:
   a. a platform adapted to support the wood members above a floor surface;
   b. the wood members supported in an axial array on the platform;
   c. filling material surrounding each of the wood members, the filling material forming a surrounding jacket over, under and between the wood members;
   d. a layer of sawdust applied over the surrounding jacket;
   e. an earth layer applied over the layer of sawdust; and
   f. at least one ignition access port extending through the surrounding jacket, sawdust layer and earth layer.

2. The kiln structure of claim 1, wherein the platform is adapted to support the wood members in an axial array.

3. The kiln structure of claim 1, wherein the earthen layer is substantially free of stone material.

4. The kiln structure of claim 1, wherein the earthen layer is substantially free of metal materials.

5. The kiln structure of claim 1, wherein the wood members comprise hardwood.

6. The kiln structure of claim 5, wherein the wood members comprise birch wood.

7. The kiln structure of claim 1, wherein the filling material comprises pieces of birch wood.

8. The kiln structure of claim 1, wherein the earth layer comprises clay earth.

9. The kiln structure of claim 1, wherein the earth layer comprises sand.

10. The kiln structure of claim 1, wherein the earth layer comprises a mixture of clay earth and sand.

11. The kiln structure of claim 1, wherein the earth layer is impervious to air.

12. The kiln structure of claim 1, wherein the wood members are substantially dry.

13. The kiln structure of claim 1, wherein the wood members each have a longitudinal axis, and the wood members are stacked axially parallel to each other.

14. A process for producing charcoal from hardwood comprising the steps of:
   a. preparing a plurality of hardwood members in a predetermined array;
   b. supporting the axial array of hardwood members on a substantially flat surface;
   c. constructing an air impervious kiln over the array of hardwood members;
   d. providing an access port through the kiln, the access port extending to the array of hardwood members;
   e. igniting the hardwood members through the access port in the kiln;
   f. closing the access port subsequent to ignition and preventing ambient air from contacting the hardwood members;
   g. allowing the hardwood members to burn for a first predetermined amount of time;

h. allowing the hardwood members to cool for approximately 24 hours after the first predetermined amount of time;

i. removing non-hardwood impurities from among the hardwood members;

j. allowing the hardwood members to cool for a second cooling period of approximately 24 hours; and k. additionally cooling the hardwood members by stifling the hardwood members for approximately 48 hours.

15. The process of claim 14 wherein the step of constructing the kiln comprises the steps of:

c1. surrounding the hardwood members with filling material to form a surrounding jacket;

c2. applying a layer of sawdust over the surrounding jacket; and c3. applying a layer of earth material over the layer of sawdust.

16. The process of claim 15, wherein the layer of earth material comprises a composition of clay earth and sand.

17. The process of claim 16, wherein the composition of clay earth and sand is free of stone material.

18. The process of claim 16, wherein the composition of clay earth and sand is free of metal material.

19. The process of claim 16, wherein the composition of clay earth and sand is free of stone material and free of metal material.

\* \* \* \* \*